United States Patent [19]

Elliott

[11] 4,400,654
[45] Aug. 23, 1983

[54] DIGITAL SPEED CONTROL FOR A BRUSHLESS DC MOTOR

[75] Inventor: Mark L. Elliott, Richfield, Minn.

[73] Assignee: Magnetic Peripherals Inc., Minneapolis, Minn.

[21] Appl. No.: 248,644

[22] Filed: Mar. 27, 1981

[51] Int. Cl.³ .............................................. H02P 5/06
[52] U.S. Cl. ...................................... 318/312; 318/341
[58] Field of Search ............................... 318/310–313, 318/341

[56] References Cited

U.S. PATENT DOCUMENTS

| 3,313,994 | 4/1967 | Haydon | 318/311 |
| 3,953,776 | 4/1976 | Wolf | 318/312 |
| 4,160,939 | 7/1979 | Damouth et al. | 318/313 X |
| 4,280,082 | 7/1981 | Acharya et al. | 318/341 |
| 4,298,832 | 11/1981 | Acker et al. | 318/341 X |

Primary Examiner—J. V. Truhe
Assistant Examiner—W. E. Duncanson, Jr.
Attorney, Agent, or Firm—Joseph A. Genovese; Edward P. Heller, III

[57] ABSTRACT

A digital control system is provided to regulate the speed of a brushless DC motor via pulse-width modulation. Digital counters are used to measure the difference between the time for a motor revolution and a reference time. This time difference is in turn used to control the time until the application of power during a fixed period. A motor speed decrease increases the difference in time between a motor revolution and the reference time. This decreases the power pulse delay time and results in an increased power-on time to bring the motor back up to nominal speed.

1 Claim, 2 Drawing Figures

DIGITAL SPEED CONTROL FOR A BRUSHLESS DC MOTOR

BACKGROUND OF THE INVENTION

1. Field of the Invention

The invention relates generally to brushless motor speed controls and more specifically to digital speed controls.

2. Brief Description of the Prior Art

Prior brushless motor speed controls have had two basic aspects, a speed sensing technique and a power control technique. Among the speed sensing techniques are:

1. Frequency to voltage conversion involving converting rotor position sensor signals to a voltage proportional to shaft speed and comparing this to a reference signal to develop an error signal;
2. A phase locked loop wherein the rotor position signal is phase compared with a reference signal to develop an error signal; and
3. A digital measurement of rotation time from the rotor position signals which is compared with a reference time period to develop an error signal.

Among the power control techniques are:

1. A linear control wherein the error signal controls a linear regulator of motor drive voltage or current;
2. An on/off control turning the power off at nominal speed or on and off over fixed-width control periods; and
3. Pulse-width modulation in which the error signal is used to control the duty cycle of power continuously applied to the motor.

The present invention generally employs the third-mentioned of these techniques in an improved, cost effective fashion suitable in those environments where the brushless motor is to be driven at a constant speed. U.S. Pat. No. 4,103,216 to Hayes employs both digital time measurement and pulse-width modulation; however, the algorithm used therein necessitates a digital memory, several registers and and arithmetic-logic-unit, which are not needed by the present invention. See also U.S. Pat. No. 4,218,735 to McCutcheon which uses an even more complex microprocessor.

SUMMARY OF THE INVENTION

The invention comprises a sensor which outputs a periodic signal on rotation of the motor's rotor; a counter which begins counting on receipt of one sensor output signal and outputs a $T_{ref}$ signal upon reaching a predetermined $T_{ref}$ count, the time to count to $T_{ref}$ being just shorter than the time between two sensor output signals when the motor is operating at nominal speed; a delta-T counter which begins counting on receipt of a $T_{ref}$ pulse and ends counting on receipt of the next sensor output signal or upon reaching maximum count, whichever comes first, and a pulse delay counter which loads the delta-T count and counts up from there to a predetermined count, preferably its maximum count, and then outputs a signal which enables power application to the motor for the balance of a fixed period.

When the motor speed is such that the time between sensor outout signals is less than or equal to $T_{ref}$, delta-T is equal to zero and the pulse delay counter will count its maximum before enabling power application. This maximum delay slows the motor. As the motor slows, the time between sensor output signal increases beyond $T_{ref}$, delta-T is greater than zero, and the pulse delay count is likewise lessened, shortening the delay to power application, and increasing the amount of time power is applied to the motor during the fixed period.

In the preferred embodiment, the sensor output occurs once each 360° of rotor rotation. Further timing means outputs a pulse each 30°, or 12 times during this interval. At each 30° pulse, the pulse delay counter loads the delta-T count from a latch and counts up to enable power. There are, then, 12 equal delays and 12 equal periods of power application between sensor outputs, after which a new delta-T has been counted and loaded into the latch. The new count is used in the subsequent 12 time intervals.

DESCRIPTION OF THE PREFERRED EMBODIMENT

Figure 1:
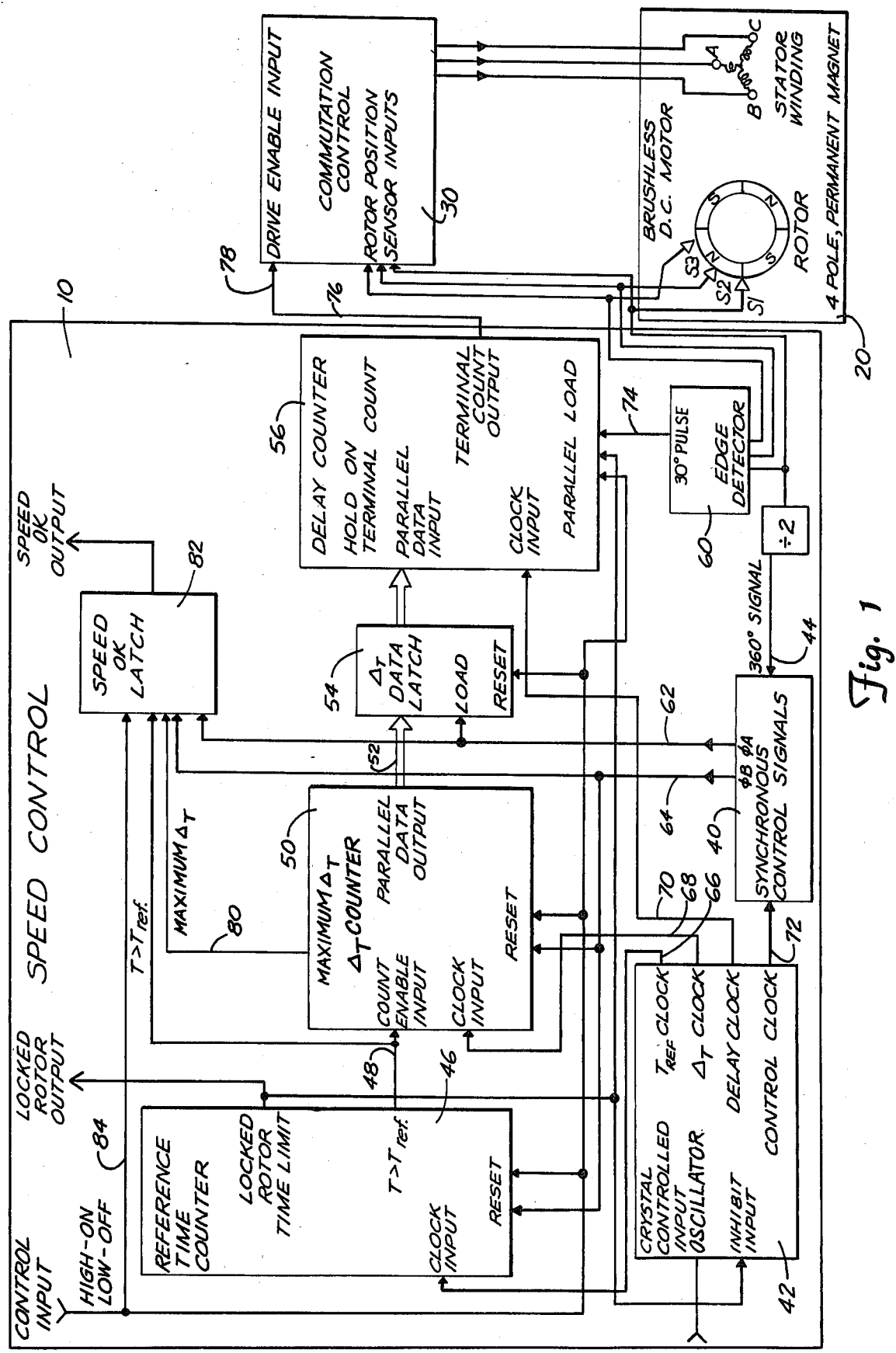
FIG. 1 shows a block diagram of the digital speed control for a brushless DC motor of the present invention.

Referring to FIG. 1, speed control 10 of the present invention is used in conjunction with a conventional brushless DC motor 20 having conventional commutator power control logic 30. While the present invention is described in relation to a brushless DC motor, it will be apparent to those skilled in the art that with minor modifications the invention made be applied to any DC motor.

In the conventional brushless DC motor 20, the rotor is a 4-pole permanent magnet type. Sensors S1 through S3, typically hall effect sensors, are spaced from each other 30 degrees. On rotation of the magnets of the rotor, the hall effect sensors output a repeating periodic signal, as shown in the timing diagram S1, S2 and S3 of FIG. 2. One of these signals, S1 in the figure, is input to a divide by two circuit the output of which becomes the 360 degrees signal shown in FIG. 2. As can be seen from FIG. 2, the 360 degree signal has a positive going transition each 360 degrees of rotation of the rotor. The position sensors S1 through S3 also provide inputs to the power commutation electronics 30, which switches the DC power alternately through stator windings A, B and C in a star configuration as known in the art.

The leading edge of the 360 degree signal 44 triggers a two cycle control 40 which outputs the mutually exclusive signals phi-A and phi-B 62 and 64, respectively. On phi-A, the output from the delta-T counter 50 is loaded into the delta-T latch 54. On phi-B, the reference time counter 46 and the delta-T counter 50 are reset. Phi-A and phi-B are synchronized with the counter clocks 42 via control clock 72.

In the preferred embodiment, where it is desired to operate the brushless DC motor at 3,600 rpm's, the crystal controlled clock 42, driven by a 4 megahertz external clock source, outputs the following clock signals at the following rates: the $T_{ref}$ clock 66 is a two megahertz signal; the delta-T clock 68 is a one megahertz signal; and the delay counter clock is a 62.5 kilohertz signal, which is one-sixteenth the rate of the delta-T clock signal.

At the receipt of a phi-B signal 64, the reference time counter 46 is reset. The phi-B signal, as previously mentioned, signals the receipt of a 360 degree signal from hall sensor S1. Thereafter the $T_{ref}$ clock 66 clocks the reference time counter 46 at a two megahertz rate. The receipt of the clock causes the counter to increment. Internal logic compares the counter's count with a predetermined count, $T_{ref}$, which in the preferred embodiment, is a count of 33,280, which represents 16.64 milliseconds. If the rotor rotates 360 degrees in 16.64 milliseconds, it is rotating at 3,605.8 rpm's.

When the reference time count counters count exceeds $T_{ref}$, the counter 46 outputs a signal 48 which represents the fact that the rotor's time period, T, exceeds the reference time period, $T_{ref}$.

This signal 48 is provided as count-enable input to delta-T counter 50. On receipt of this input 48, delta-T counter begins to count. The counter increments at the rate of one increment every microsecond, as the delta-T clock is one megahertz. In the preferred embodiment, the delta-T counter is only a six-bit counter. The maximum count represents 64 microseconds.

At the next receipt of 360 degree signal, phi-A is generated by the synchronous control 40, which causes the delta-T latch 54 to copy the count present in delta-T counter 50. Thereafter, synchronous control 40 generates phi-B, which resets the delta-T counter 50 (it also resets the reference time counter 46). The delta-T counter is of a type which holds on maximum count, i.e., it does not overflow to zero on incrementation from its maximum count.

Figure 2:
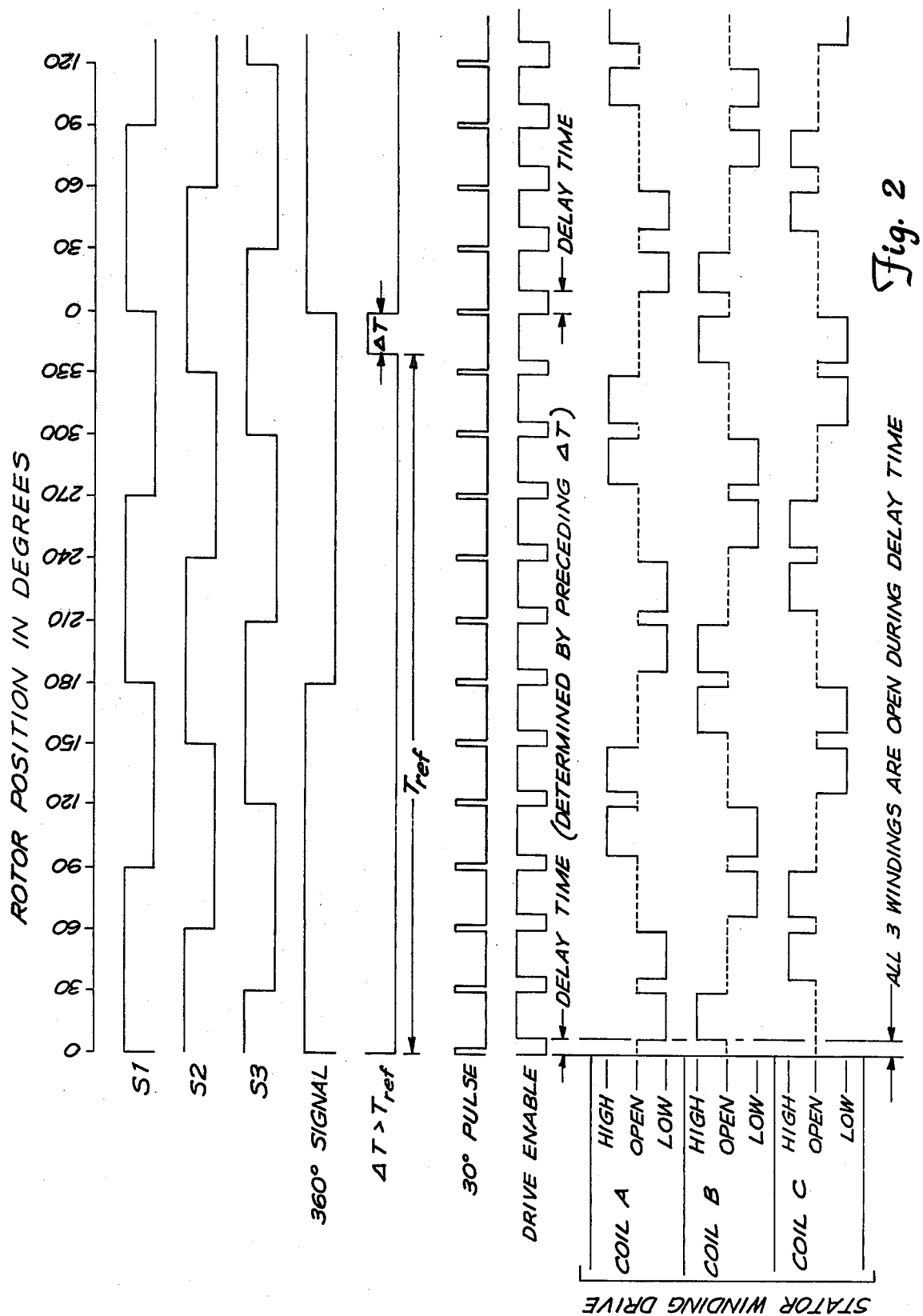
FIG. 2 shows a timing diagram of various of the significant signals of FIG. 1.

The three hall effect sensors S1, S2 and S3 are also provided as inputs into a 30 degree pulse edge detector 60, which outputs a pulse 74 every thirty degrees, as can be seen by reference to FIG. 2. This 30 degree pulse 74 is provided as an input to delay counter 56 and causes the delay counter to copy the count present in the delta-T latch 54. At the fall of the 30 degree pulse, the delay counter begins counting up from the count it just loaded toward a predetermined count, or, in the case of the preferred embodiment, the counter's maximum count. In the preferred embodiment the delay counter 56 is a six-bit counter. Thus the maximum count is 64. On reaching its maximum count, the counter holds. It also outputs a signal, drive-enable 76, which is provided as an input 78 to power commutation control 30. On receipt of the drive-enable signal, power is applied to the stator windings, as can be seen in the drive enable timing diagram of FIG. 2. It will also be noted that, at every 30 degrees, the power commutation control 30 switches the power to different terminals of the stator windings, as shown in the timing diagram for coils A, B and C in FIG. 2.

In the preferred embodiment the delay counter 56 is a six-bit counter. Clock 70, operating at 62.5 kilohertz, is 16 times slower than the delta-T counter clock 68. Thus every one microsecond count of the delta-T counter converts into a decrease of 16 microseconds in the delay time of delay counter 56. If the delay counter were to count its entire count before reaching maximum count, it would count 64 counts of 16 microseconds each for a total maximum delay time of 1.024 milliseconds. At 3,605.8 rpm's, the time between 30 degree pulses is 1.387 milliseconds. Thus when the rotor is rotating at 3605.8 rpm's, at which T is equal $T_{ref}$, the delta-T counter is equal to zero, and the delay counter counts its maximum delay of 1.024 milliseconds, the power on time is 1.387 milliseconds minus 1.024 milliseconds, or 0.363 milliseconds, which is the minimum power-on time. As motor speed decreases, the duration of a 30° period increases as well as the percentage of time power is on during the period. This results in a rapid increase in power as speed falls, bringing the motor back up to nominal speed.

At all speeds where T, the time counted by the reference time counter between two 360 degree pulses is less than or equal to $T_{ref}$, (i.e., greater than or equal to 3605.8 rpm's) the delta-T counter 50 will count zero counts and the delay counter 56 will count its maximum count for a delay of 1.024 milliseconds. Similarly when the time period T exceeds the $T_{ref}$ time period by 64 or more microseconds, which represents an rpm of 3592, the delta-T counter 50 will reach its maximum count (16) and the delay counter 56 will load this maximum count and "immediately" turn on the drive-enable 76, resulting in a minimal delay.

A "Speed OK" signal is generated when the motor speed is above 3,592 RPM and below 3,605.8 RPM. The Speed OK latch monitors the $T_{ref}$ counter and the delta-T counter. If delta-T reaches its maximum count, speed is below 3,592 RPM; if the reference counter fails to reach $T_{ref}$, speed is above 3,605.8 RPM.

The control input 84 serves as an on/off signal. A low level on the control input clears the counters and inhibits the drive-enable output.

It is to be understood that the specifications of clock frequencies, rpm's and the like are exemplary only for the preferred embodiment in which the brushless DC motor drives the rotor at a nominal rpm of 3600. Other time bases and predetermined counts may be chosen by those skilled in the art for equivalent applications. For example, in a variable speed motor, means might be provided to vary the $T_{ref}$ count in the reference time counter 46. Similar modifications will occur to those skilled in the art.

An advantage of the all-digital speed control 10 of the present invention is that it may be manufactured on a single LSI chip which lowers its cost. Also the digital system can be made flexible by designing the various counters and reference counts to be programmable which adds the ability for a single speed-control chip to perform multiple functions and be used in different applications.

The enumeration of the specific elements of the preferred embodiment is not by limitation on the scope of the appended claims in which I claim:

1. A digital motor speed control comprising:
   sensor means for producing a periodic sensor output on rotation of a motor's rotor;
   timing means for measuring the time, T, between sensor outputs including counter means for counting from an initialized count in response to receipt of a first sensor output;
   comparison means for measuring how much the sensor output time, T, is greater than a reference time $T_{ref}$ including means for comparing the count of said counter means with a predetermined count, $T_{ref}$, means responsive to said counts being substantially equal for outputing a $T_{ref}$ signal;
   delta-T counter means for counting from an initialized count on receipt of said $T_{ref}$ signal and ending counting in response to receipt of a second sensor output, the ending count comprising a delta-T count;
   delta-T latch means for retaining said delta-T count between two sensor outputs;
   means for dividing the time between two sensor outputs into a predetermined number of fixed periods and means for outputting a pulse signal at the end of each period;

pulse-delay timing means for delaying the on-time of power in a periodic application of power to the motor including means responsive to said comparison means for reducing the amount of delay in proportion to the greatness of the difference between the sensor output time, T, and the reference time, $T_{ref}$, which includes delay-counter means for periodically loading the delta-T count from said delta-T latch in response to said pulses and means for counting up from there to a predetermined count, and means for then enabling power application to said motor.

* * * * *